United States Patent
Powell

(10) Patent No.: US 7,352,775 B2
(45) Date of Patent: Apr. 1, 2008

(54) PARTIAL DUPLEX FREQUENCY DOMAIN MODULATOR SYSTEM AND METHOD

(75) Inventor: Scott Powell, Carlsbad, CA (US)

(73) Assignee: Broadcom Corporation, Irvine, CA (US)

( * ) Notice: Subject to any disclaimer, the term of this patent is extended or adjusted under 35 U.S.C. 154(b) by 817 days.

(21) Appl. No.: 10/797,709

(22) Filed: Mar. 11, 2004

(65) Prior Publication Data

US 2004/0258093 A1    Dec. 23, 2004

Related U.S. Application Data

(60) Provisional application No. 60/479,916, filed on Jun. 20, 2003.

(51) Int. Cl.
*H04J 1/00* (2006.01)
(52) U.S. Cl. .................................... 370/480; 370/276
(58) Field of Classification Search ............... None See application file for complete search history.

(56) References Cited

U.S. PATENT DOCUMENTS

| | | | | |
|---|---|---|---|---|
| 6,987,951 B2* | 1/2006 | Boos | ............................. | 455/85 |
| 7,046,999 B2* | 5/2006 | Wu et al. | .................... | 455/420 |
| 2001/0002924 A1* | 6/2001 | Tajima | ........................ | 375/271 |
| 2003/0050018 A1* | 3/2003 | Weissman et al. | ............ | 455/82 |

* cited by examiner

*Primary Examiner*—Brian Nguyen
(74) *Attorney, Agent, or Firm*—Sterne, Kessler, Goldstein & Fox PLLC

(57) ABSTRACT

In a multi-carrier transmission scheme (frequency domain multiplexed—FDM), a single high rate data stream is split into multiple lower rate data streams each transmitted over a different carrier (e.g., a tone or bin). The data rate possible from a multiple-carrier transmission scheme is theoretically equivalent to the data rate possible from a single-carrier (including baseband) scheme with the same composite bandwidth. The scheme allows for a communications system that can selectively send each data signal (e.g., audio data, video data, raw data, etc.) partitioned out into full and half duplex sections (e.g., tones). The scheme can have a reduced complexity and cost and use less bandwidth. This is done by being able to selectively split a data signal into both full and half duplex tones.

21 Claims, 7 Drawing Sheets

PARTIAL DUPLEX FREQUENCY DOMAIN MODULATOR SYSTEM AND METHOD

CROSS REFERENCE TO RELATED APPLICATIONS

This application claims benefit under 35 U.S.C. 119(e) to U.S. Provisional Patent Application No. 60/479,916, filed Jun. 20, 2003, entitled "Partial Duplex Frequency Domain Modulator System And Method," which is incorporated by reference herein in its entirety.

BACKGROUND OF THE INVENTION

1. Field of the Invention

The present invention is related to full and half duplex communication in a communications system.

2. Background Art

Simultaneous point-to-point communication between two transceivers is typically implemented with either a full duplex or a half duplex transmission scheme. Half duplex communication uses two dedicated channels connecting the transceivers. Each channel transmits data in a single direction. In full duplex communication, two transceivers use a single shared channel supporting simultaneous transmission in both directions. Full duplex communication increases the data rate by a factor of two over half duplex transmission. However, full duplex systems can require more complex circuitry and signal processing for transceivers on both ends of a single channel to transmit simultaneously.

One example communication system can be gigabit Ethernet, which is almost always full duplex. When a signal is transmitted over a wire, a part of the signal (e.g., echo, structural return loss, etc.) is reflected back, and the magnitude of the remaining portion of the signal is a function of the length of the wire. As the wire increases in length, the echo may remain the same magnitude, but a received signal becomes increasingly attenuated due to the long wires. At a certain point, a received signal having too small a magnitude can be drowned out by the echo.

In the cases where long wires are used, a substantial amount of a signal that is being processed can be the undesired echo. A more complex signal processing method has to occur to compensate for and recover the weak received signal. This is because a receiver has a limited dynamic range, which is usually used to amplify the received signal. However, with a large undesired echo the entire range can be overwhelmed by the echo.

An analog-to-digital converter (ADC) in the communications system is most significantly impacted by this situation. Typically, the ADC takes a received analog signal and turns it into a digital representation. However, when the received signal is weak, a very high number of bits are required for the ADC to operate because the system has to quantize the small signal and the large echo. This can require a complex, high power, and very expensive circuitry.

If digital echo cancellation is to be used to remove the echo from the received full duplex signal, an ADC must first quantize it. To reliably recover data from the remote transmitter, the quantization step size of the ADC must be small relative to the portion of the received signal that is due to the remote transmitter. Because of the large echo, the accuracy (e.g., number of bits, linearity, clock jitter, etc.) required from the ADC is higher in full duplex than in half duplex communication schemes. However, in many transmission channels, such as twisted pair cables, full duplex high data rates can easily require high speed ADC's with resolution requirements (e.g., number of bits) beyond what is realistically achievable in today's technology.

Therefore, what is needed is a system and method than allow for high data rates without canceling out, from a received signal, the echo from a locally transmitted signal.

BRIEF SUMMARY OF THE INVENTION

One embodiment of the present invention provide a system including a signal splitter, a duplex determining device, a combiner and a transmitter. The signal splitter receives a first signal and produces second signals in different frequency ranges therefrom. The duplex determining device generates third signals including flagged second signals that are designated as being transmittable as one of half duplex and full duplex. The combiner combines the third signals into a fourth signal. The transmitter (e.g., a transceiver) transmits the fourth signal.

Another embodiment of the present invention provides a method including at least the following steps. A first signal is received. Second signals are formed from the first signal, each of the second signals being in a different range of frequencies. A determination is made whether each of the second signals should be transmittable in half duplex mode or full duplex mode. Third signals are formed by flagging each of the second signals as being a half duplex-type signal or a full-duplex type signal based on the determining step. The third signals are combined form a fourth signal, which can then be transmitted.

The above embodiments of the present invention can provide partial duplex frequency domain multiplexed (FDM). Partial duplex FDM can be a multi-carrier scheme (e.g., multiple tone, bin, or carrier signal scheme, herein all are referred to as "tone") where each tone can be transmitted in the format (e.g., full duplex, half duplex, etc.) that can be best suited for the tone's particular frequency range.

In one embodiment, frequency ranges with high return loss and low attenuation can transmit tones in full duplex. In full duplex tones, the echo can be a small portion of the total received signal and requires little to no increase in ADC accuracy to permit digital echo cancellation. These tones exploit the two times data rate increase of full duplex operation. Similarly, frequency ranges with low return loss and high attenuation can transmit tones in half duplex. In half duplex tones, the received signal can be comprised entirely of the remote transmitted signal and can be not corrupted by the large echo that would otherwise exist if the tones were used in full duplex mode. The attenuation in half duplex tones can be compensated with a simple gain stage. The absence of the otherwise large echo greatly simplifies the ADC requirements in half duplex tones.

Thus, according to one or more embodiments of the present invention, partial duplex FDM can offer a higher data rate than half duplex schemes, while maintaining simpler ADC requirements than full duplex schemes.

Further embodiments, features, and advantages of the present inventions, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

Figure 1:
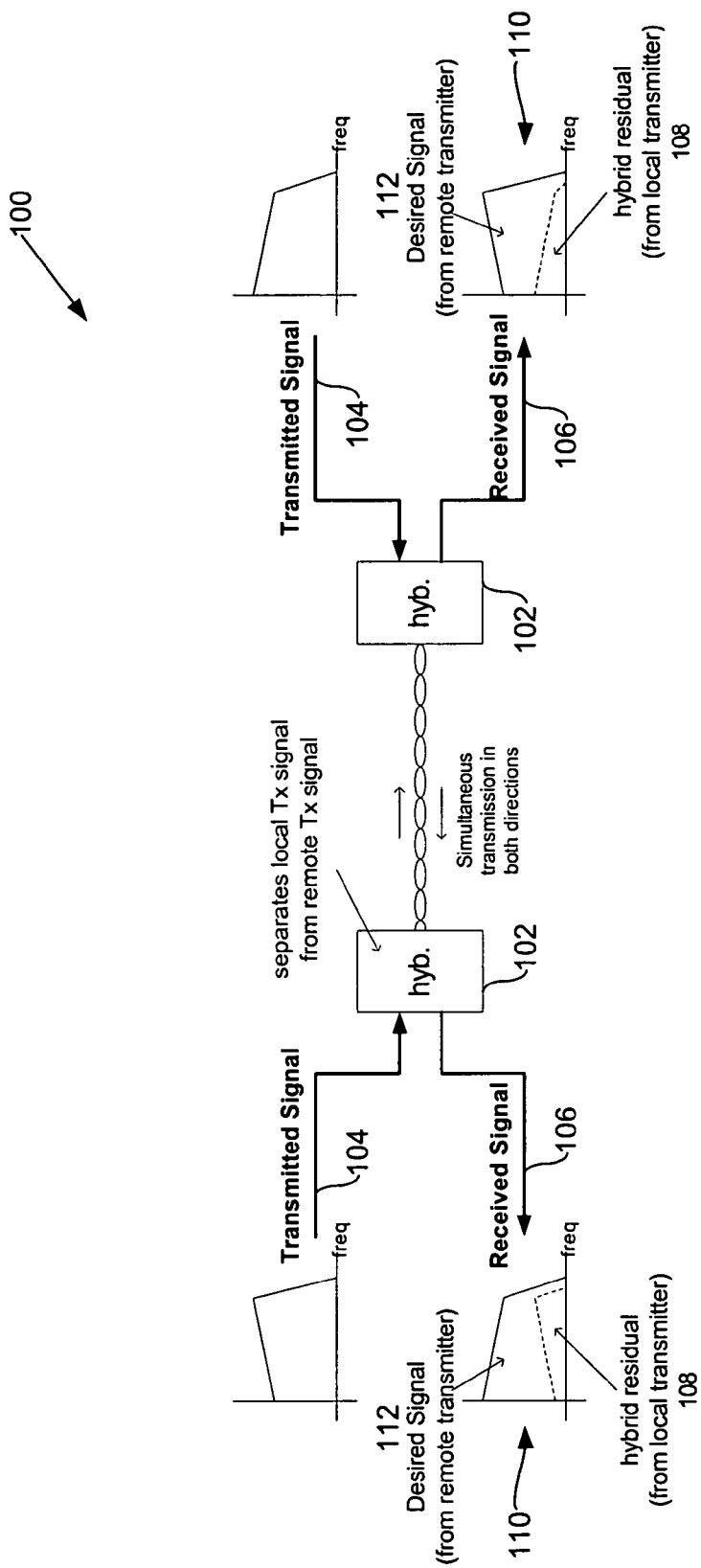
FIG. 1 shows a conventional full duplex communications system.

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

Overview

In a multi-carrier transmission scheme (frequency domain multiplexed—FDM), a single high rate data stream is split into multiple lower rate data streams each transmitted over a different carrier (e.g., a tone or bin). The data rate possible from a multiple-carrier transmission scheme is theoretically equivalent to the data rate possible from a single-carrier (including baseband) scheme with the same composite bandwidth.

FIG. 1 shows full duplex transmission in a conventional communications system 100. Each full duplex transceiver 102 has an analog hybrid to perform a coarse separation of transmitted signal 104 and received signal 106. However, a residual signal 108 from transceiver 102 combined with reflections of transmitted signal 104 corrupt received signal 106. This is shown in graphs 110, where a desired signal 112 is corrupted because of residual signal 108. Advanced signal processing techniques are required to remove residual signal 108 and echoes of transmitted signal 104. This process is known as echo cancellation and is normally performed with a digital echo canceller (not shown).

Figure 2:
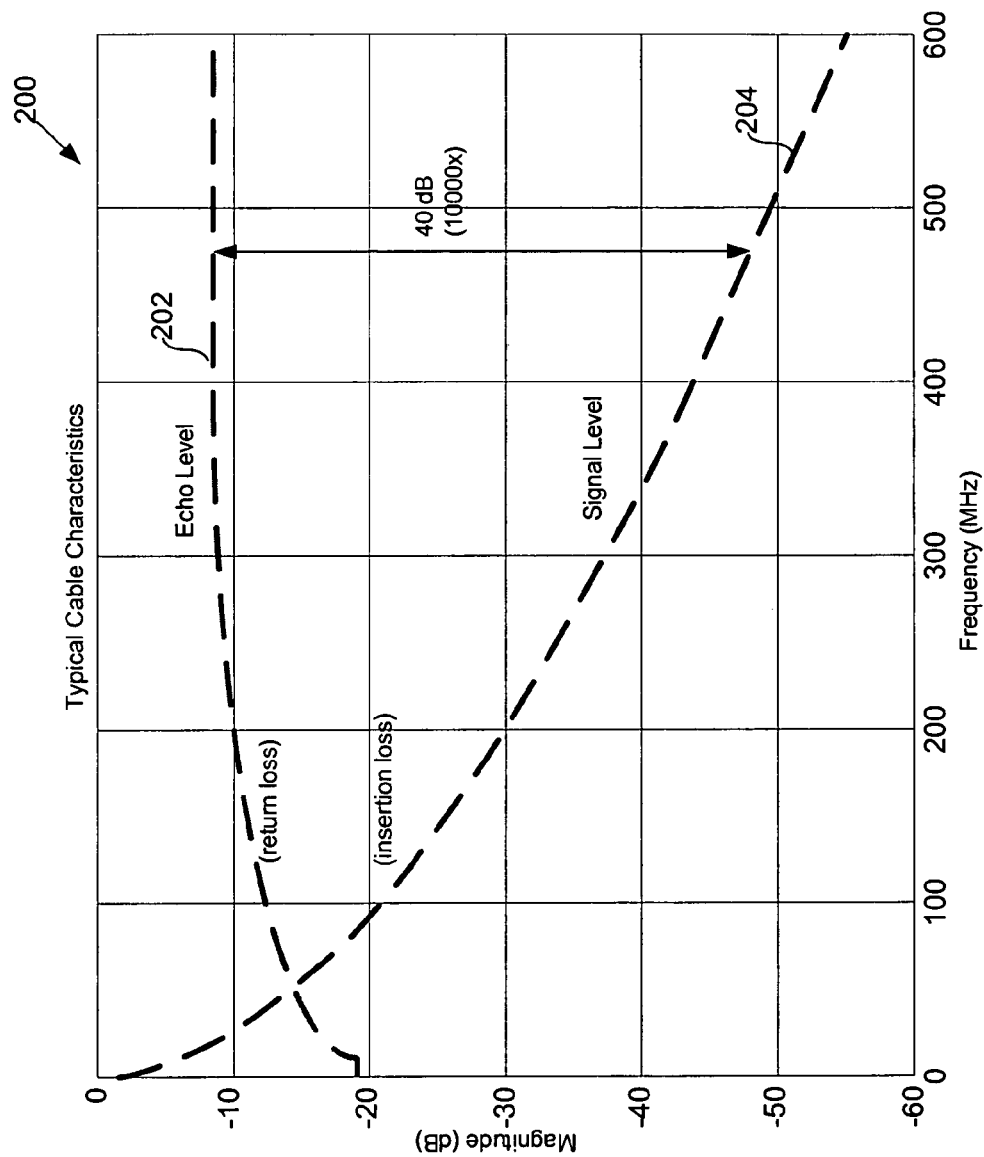
FIG. 2 shows a graph illustrating typical cable characteristics in a communications system.

FIG. 2 shows a graph 200 illustrating characteristics of a typical cable. The portion of transmitted signal 104 that is reflected back (the echo), which is also defined as return loss, is shown as line 202 and an attenuation of a received signal 106, which is also defined as insertion loss, is shown as line 204. In typical twisted pair cables, return loss 202 degrades (echo increases) with frequency and signal attenuation 204 increases (signal strength decreases) with frequency. At higher frequencies, echo 202 (e.g., residual signal 108) from transceiver 102 can be many times larger than a signal received (e.g., received signal 106) from a remote transceiver 102. For wideband signals (required for high data rates, such as gigabit Ethernet), the echo occupies a significant portion of the received signal 106. Thus, relatively speaking, a contribution to the received signal 106 from remote transceiver 102 can be relatively very small.

Embodiments of the present invention allow for a communications system that can selectively send each data signal (e.g., audio data, video data, raw data, etc.) partitioned out into full and half duplex sections (e.g., tones). In contrast, conventional systems could only transmit data signal as entirely full duplex or entirely half duplex. The present invention may use more bandwidth than previous full duplex systems, but can have a reduced complexity and cost and will use less bandwidth than previous half duplex systems. This is done by being able to selectively split a data signal into both full and half duplex tones.

Which tones are full and half duplex can be based on either a signal response for a typical cable or a specific cable being used to send the data signals. For example, a cable can have more attenuation at low frequency and substantially less at high frequency. Then, low frequency tones can be designated half duplex and high frequency signals can be designated full duplex. It is to be appreciated the opposite is also true, and falls within the scope of the present invention.

In one example, wired or wireless communications systems use several narrow band frequency domain signals, where a part of the data is placed on each of the several narrow frequency bands. This can allow for having full duplex (e.g., data is transmitted and received on the same wire and in frequency band) and half duplex (e.g., signal on a same wire going in one direction one frequency band). For example (see FIG. 5), data in a low frequency bands (e.g., about 0 to about 100 MHz) could be transmitted full duplex and high frequency bands (e.g., about 100 MHz and up) could be transmitted half duplex. The echo is not relatively large compared to the received signal in the low frequency band. Also, using half duplex for higher frequency can result in there being basically no echo since there is no transmission signal, only a received signal.

In traditional wideband full duplex transmission, the echo from the local transmitter's signal can dominate the received signal. A high resolution ADC is required to maintain a dynamic range large enough to quantize the small desired signal buried within a large corrupting echo. In contrast, using the Partial Duplex FDM scheme of the present invention, a first subset of FDM tones is transmitted using full duplex transmission over frequency ranges where the return loss is higher. The lower-level echo does not seriously impact an ADC for these full duplex tones. A second subset of the FDM tones is transmitted using half duplex transmission over frequency ranges where the return loss is lower. The lower return loss will not impact the ADC requirements since the half duplex tones are not degraded by echo.

Overall System

Figure 3:
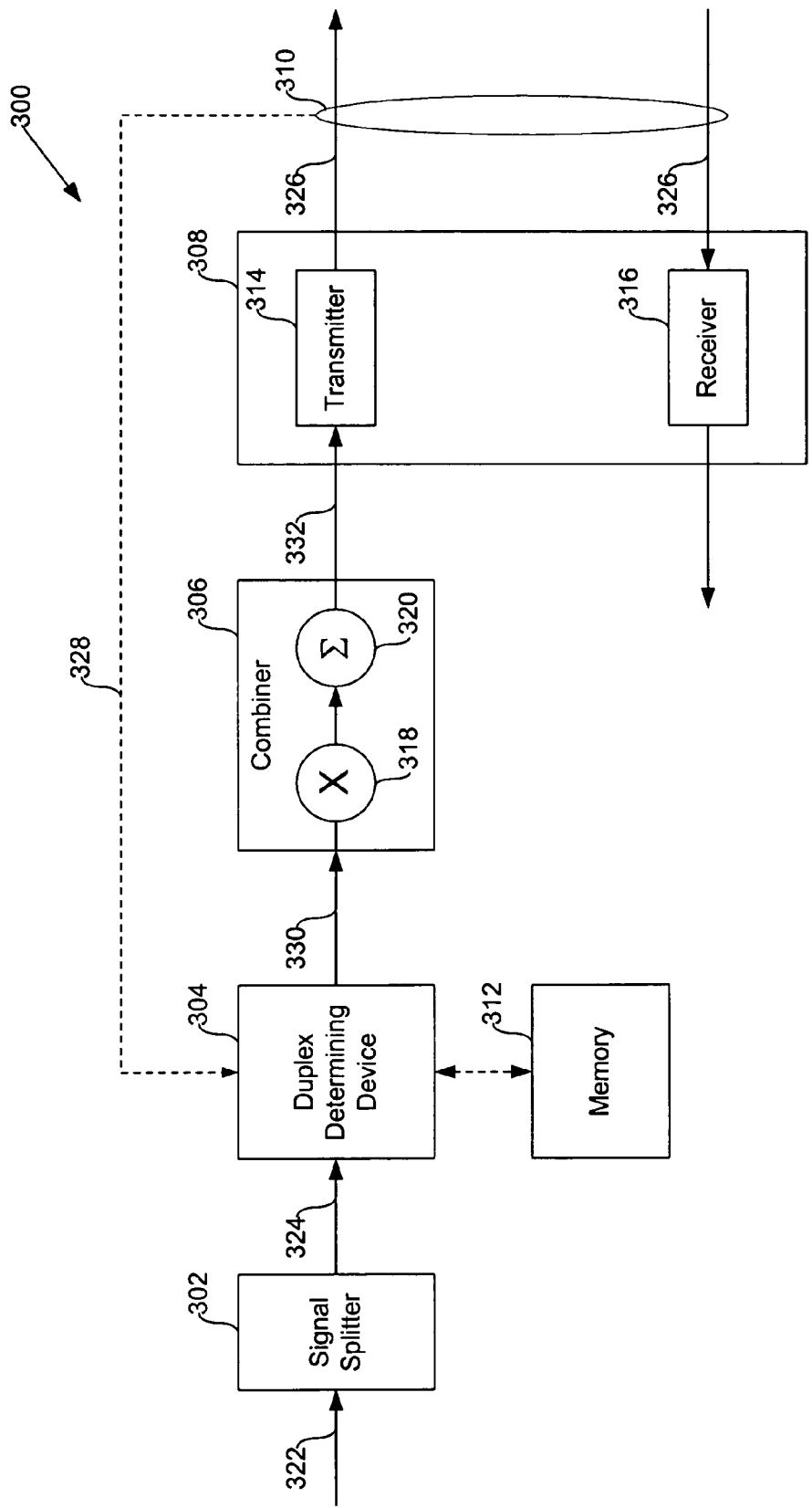
FIG. 3 shows a block diagram of a system according to an embodiment of the present invention.

FIG. 3 shows a block diagram of a system 300 according to an embodiment of the present invention. System 300 can include a signal splitter 302, a duplex determining device 304 (e.g., a processor, or the like), a combiner 306, and a transceiver 308. In one embodiment, duplex determining device 304 can be coupled to a sensor 310 and/or a memory 312, while in another embodiment the duplex determining device 304 may only be coupled to the memory 312. Transceiver 306 can include at least a transmitter 314 and a receiver 316. Combiner 306 can include a multiplying device 318 and a summing device 320.

A first signal 322 is received at signal splitter 302, which can be a multiplexer, a single-input-multiple-output switching element, or the like. A plurality of second signals 324 are generated and received at duplex determining device 304. In one embodiment, a type of a cable 326 (e.g., a twisted pair cable) or a material make-up of cable 326 is determined using sensor 310, which is incorporated in a signal 328 received at duplex determining device 304. This may be done because cable 326 is removable and replaceable, which can allow cable 326 to be any one of a plurality of types of cables having various materials depending on an application of system 300. Thus, a specific type of cable being used for each transmission event must first be determined. Duplex determining device 304 then uses the type of cable 326 along with established threshold values, possibly stored in memory 312, to individually flag each signal 324 either a full duplex signal or a half duplex signal to form third signals 330. In another embodiment, a type of cable 326 is pre-stored in memory 312. Then, duplex determining device 304 looks up the information about the cable when first signals 322 or when second signals 324 are received to perform the flagging that forms third signals 330.

Once all second signals 324 are flagged, duplex determining device transmits third signals 330 to combiner 306, which combines all third signals 330 together to form a fourth signal 332 having multiple frequency tones. Fourth signal 332 is transmitted using transceiver 308 to another, remote transceiver 308 based on the flagged type of signal (e.g., in full duplex or half duplex mode).

Figure 4:
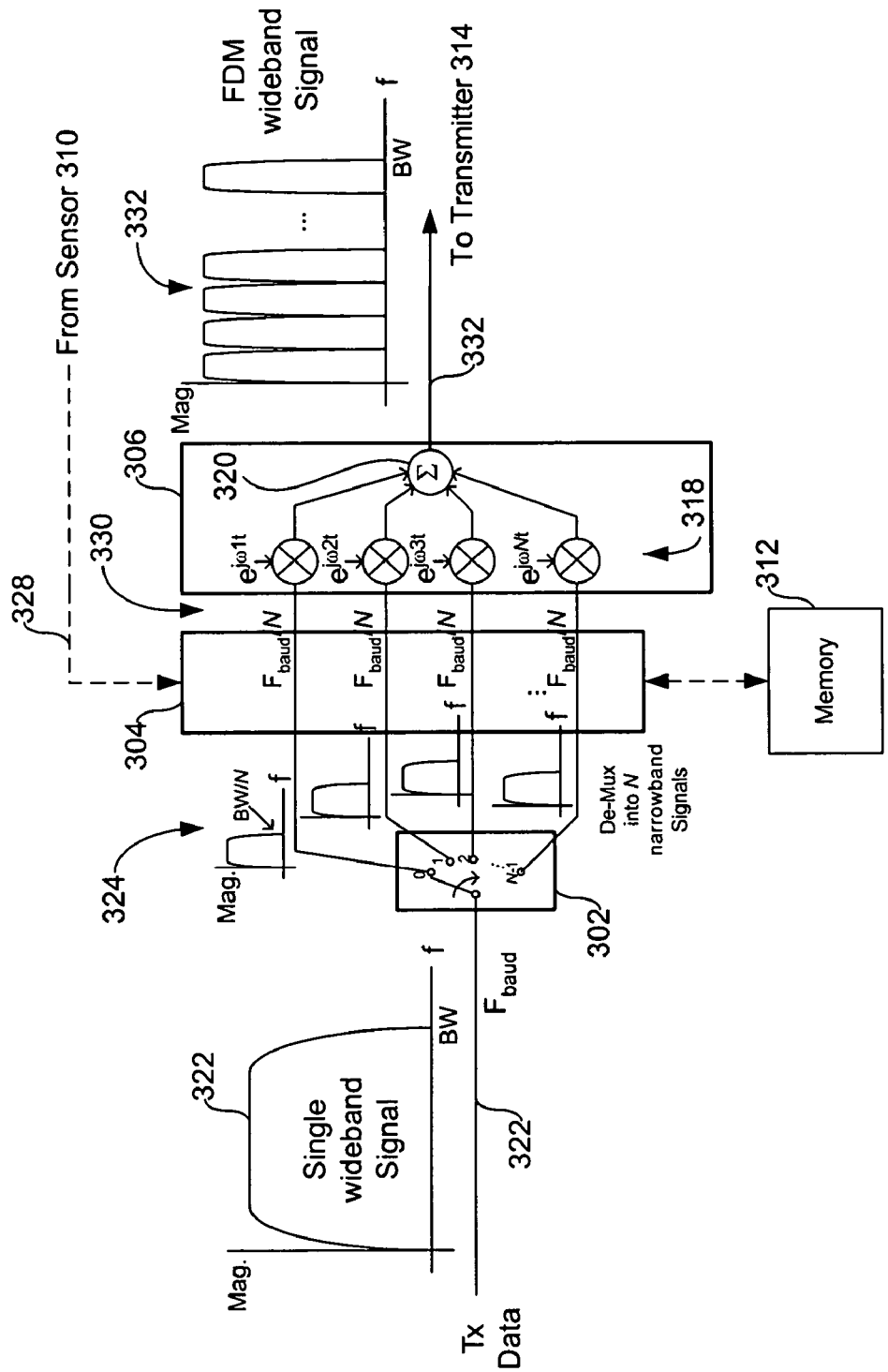
FIG. 4 shows components of the system in FIG. 3.

FIG. 4 shows components of system 300. System 300 produces multiple output data streams (fourth signals 332) at different frequencies from a single input data stream (e.g., first signal 322). A single wideband signal 322 (first signal) in a given frequency domain at the input is chopped up or split using signal splitter 304 to form a plurality of narrow band signals 324 (second signals) in the frequency domain. Multipliers 318 can shift or modulate up a frequency of the received signals 330 (third signals) to an unoccupied frequency based on a received baseband signal or variable (e.g., $e^{j\omega Nt}$ (where N=0, 1, 2, . . . ). Multipliers 318 can also give the modulated or shifted signal a center frequency. Note that this operation is also commonly done using an inverse Fourier transform (IFFT) for computational efficiency.

Partial Duplex Systems

Figure 5:
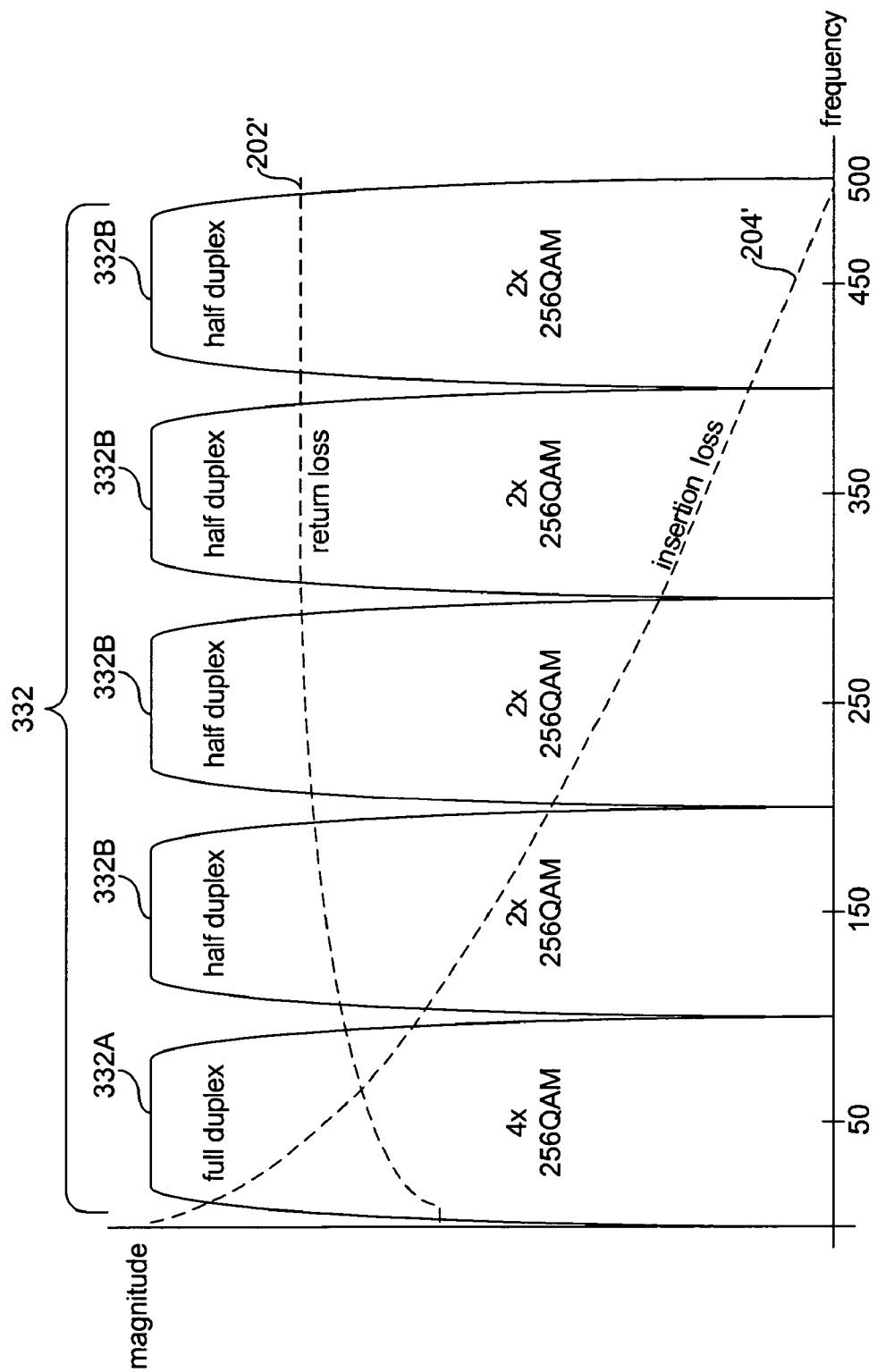
FIG. 5 shows a graph illustrating a partial duplex communications signal according to an embodiment of the present invention.

FIG. 5 shows in more detail fourth signal 332. Fourth signal 332 includes one or more sections (tones) 332A flagged for full duplex mode and one or more sections (tones) 332B flagged for half duplex mode. Which tones are flagged for full duplex mode and which tones are flagged for half duplex mode are based on where the tone falls in relation to a return loss graph 202' (which can be similar to or different than 202) and an insertion loss graph 204' (which can be similar to or different than 204) for a particular cable being used.

For example, full duplex signals for a cable can occur at or before the point where return loss curve 202' crosses insertion loss curve 204', while half duplex signals can occur after the curves cross. In this example, there is one tone 332A using full duplex and four tones 332 using half duplex.

It is to be appreciated that the amount of the baseband incorporated into each frequency tone 332A/B can be based on how wide each frequency tone 332A/B is specified. For example, if each frequency tone 332A/B is made relatively narrow (e.g., about 25-50 MHz in a 500 MHz wide signal), more frequency tones 332A/B can be transmitted in full duplex mode. In contrast, if each frequency tone 332A/B is made relatively wide (e.g., about 100-125 MHz in a 500 MHz signal), typically one frequency tone 332A/B can be transmitted in full duplex mode, while most will be transmitted in half duplex mode.

In one example, each frequency tone 332A/B can have its own demodulator/receiver (not shown). So, the more frequency tones 332A/B that are used the more demodulators/receivers that are required, and the more complex the system becomes. However, how fast a receiver has to operate is a function of the width of each frequency tone 332A/B. The fewer frequency tones 332A/B that are specified, the faster each receiver has to operate. Thus, one limitation as to the size and number of each frequency tone 332A/B can be based on the speed of receivers in the system. The width of each frequency tone 332A/B can be based on current technology, and can be adjusted for future technologies.

In this embodiment, for a full duplex transmitted bandwidth between DC and about 100 MHz, a received signal (e.g., a signal received at a first system 300 from a second system 300) can include less than ½ echo and more than ½ signal. Full duplex transmission will require only modest echo cancellation and minimal increase in ADC resolution over this frequency range. However, full duplex transmission above 100 MHz will result in the received signal being dominated increasingly more by echo. This places increasing demand on ADC resolution and echo cancellation. For example, only about 30 mV of a 1 volt signal received signal from a 500 MHz full duplex base band transmission will be due to the remote system 300 (the second system), while the remaining 970 mV is due to the echo from the local transmitter 300 (the first system).

Figure 6:
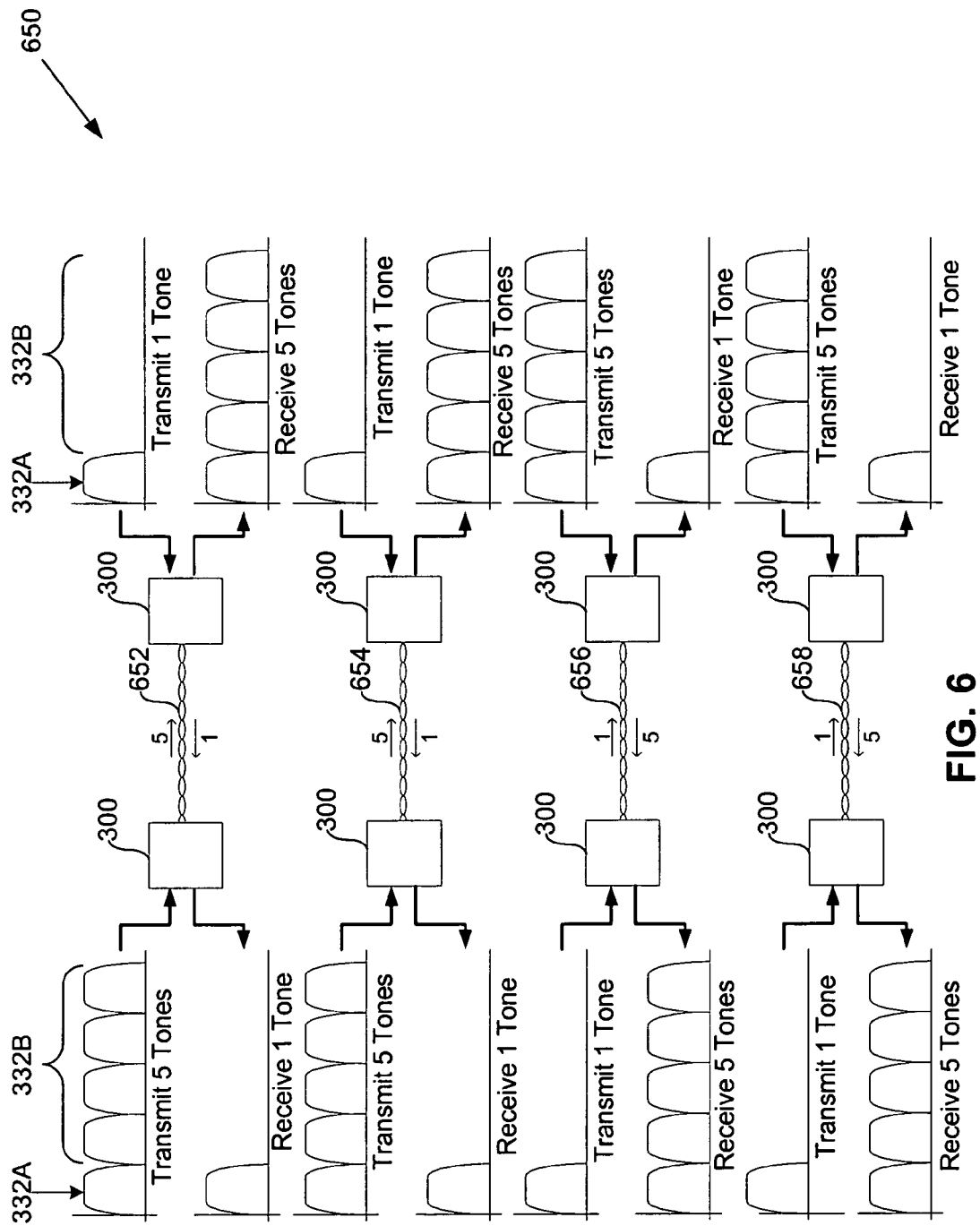
FIG. 6 shows a partial duplex communications system according to an embodiment of the present invention.

FIG. 6 shows a system 650 according to a further embodiment of the present invention. System 650 can be a four channel Partial Duplex FDM transceiver system. System 650 can include first through fourth twisted pair cables 652-658 (which can be similar to 326) transmitting at the same frequency between first and second communicating systems 300. Fourth signal 332 includes five tones (e.g., one full duplex 332A and four half duplex 332B, similar to FIG. 5). The first and second twisted pair cables 652 and 654 transmit five tones left-to-right (half duplex) and one tone in both directions (full duplex) and the third and fourth twisted pair cables 656 and 658 are opposite, so they transmit one tone in both directions (full duplex) and five tones right-to-left (half duplex). Overall, the same amount of tones are transmitted right-to-left as left-to-right.

It is to be appreciated that twisted pair cables 326 and 652-658 can be manufactured from any known or later developed materials used to transmit signals, as would be apparent to one of ordinary skill in the art upon reading this description. It is also to be appreciated that there may be no cables, and fourth signal 332 can be transmitted through any wireless system, as would be apparent to one of ordinary skill in the art upon reading this description.

It is to be appreciated that any one of the wires 652-658 can send any number of tones in either direction. For example, if there were two tones that are designated full duplex 332A and three tones designated half duplex 332B, then twisted pair cables could send five tones 332B right-to-left or left-to-right and two tones 332A in both directions. Having more full duplex tones can be based on using a shorter bandwidth or more complex ADC having more signal processing capability.

In system 650 echo cancellation may only be required in one of the five tones, for example 332A. However, the ADC resolution requirements across all five tones may be similar. Assuming 8 bit symbols and 85 Msps baud rate used in each tone, the total composite data rate in the 500 MHz bandwidth can be:

[(4 wires)(8 bits/wire)(1 full duplex tone)+
 (2 wires)(8 bits/wire)(4 half duplex tones)]
 (85 Msps)=8160 Mbps Thus, using the embodiment discussed above, according to the present invention a Partial Duplex FDM scheme is a compromise between full and half duplex transmission. For a given data rate, the required bandwidth is less than that of half duplex without the increased ADC resolution required by full duplex.

Automated Frequency Tones/Tones Processing Method

Figure 7:
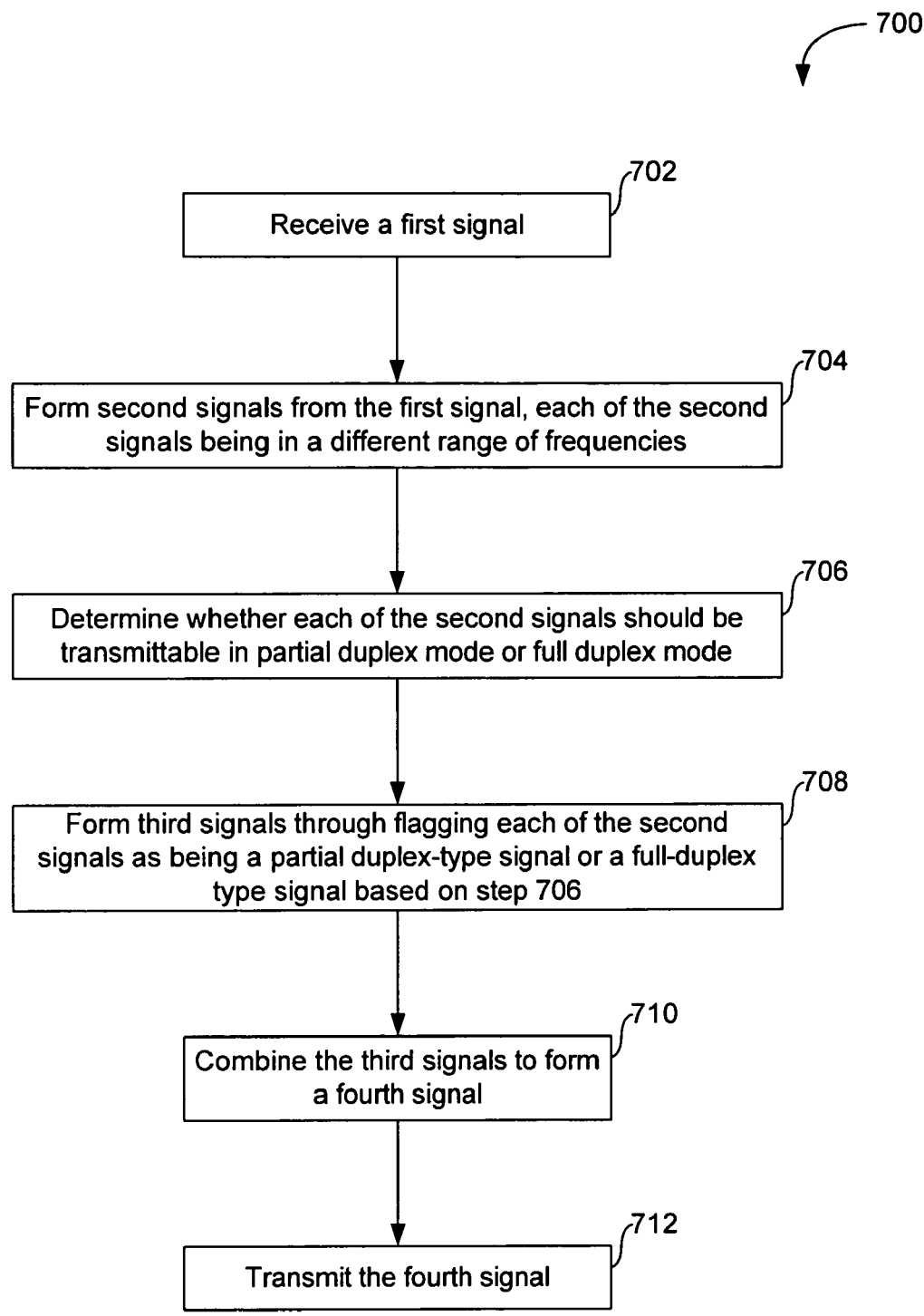
FIG. 7 shows a flow chart depicting a method according to an embodiment of the present invention.

FIG. 7 shows a flow chart depicting a method 700 according to an embodiment of the present invention. At step 702, a system (e.g., 300) receives a first signal (e.g., first signal 322). At step 704, second signals (e.g., second signals 324) are formed from the first signal, each of the second signals being in a different range of frequencies. At step 706, a determination is made whether each of the second signals should be transmittable in partial duplex mode or full duplex mode. At step 708, third signals (e.g., third signals 330) are formed through flagging each of the second signals as being a partial duplex-type signal or a full-duplex type signal based on step 706. At step 710, the third signals are combined (e.g., using combiner 306) to form a fourth signal (e.g., fourth signal 332). At step 712, the fourth signal is transmitted.

In one embodiment, step 706 can measure return and insertion loss, determine a crossing point between return and insertion loss, and/or determine what ADC is being used in a system. This information can then be used to perform step 708. In an Ethernet example, this can be done prior to a first use and may remain fixed. Thus, a standard would be required that is based on a worst case scenario cable or wire. For example, a dimensional size, how efficiently the materials conduct data based on geometry, and other considerations can be used to section a signal into frequency tones. In a DSL system example, this can be adaptively performed each time data is sent down each cable. Thus, an optimal configuration for each cable is possible. Also, the DSL system can detect parts of a frequency spectrum that has interferors or other problems, which result in the DSL system not wanting to send data over those parts of the frequency spectrum.

CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A system comprising:
   a signal splitter that receives a first signal and produces second signals in different frequency ranges from the first signal;
   a duplex determining device that generates third signals comprising flagged second signals that are designated as being transmittable as one of partial duplex and full duplex;
   a combiner that combines the third signals into a fourth signal; and
   a transmitter that transmits the fourth signal.

2. The system of claim 1, wherein the signal splitter comprises a multiplexer.

3. The system of claim 1, wherein the signal splitter comprises a single-input-multiple-output switching element.

4. The system of claim 1, further comprising:
   a cable coupled to the transmitter; and
   a sensor coupled to said duplex determining device that senses the type of said cable, wherein the duplex determining device uses the type of cable to generate the third signals.

5. The system of claim 4, wherein the second signals are flagged for the full duplex transmission when they are at least one of,
   (a) above a threshold value for return loss on the type of the cable,
   (b) below a threshold value for attenuation on the type of the cable; and
   (c) below a threshold value for echo on the type of the cable.

6. The system of claim 4, wherein the second signals are flagged for the half duplex transmission when they are at least one of,
   (a) below a threshold value for return loss on the type of the cable,
   (b) above a threshold value for attenuation on the type of the cable; and
   (c) above a threshold value for echo on the type of the cable.

7. The system of claim 1, further comprising:
   a memory device coupled to the duplex determining device that stores information corresponding to the type of cable being used to transmit the fourth signal, wherein the duplex determining device uses the information to generate the third signals.

8. The system of claim 7, wherein the second signals are flagged for the full duplex transmission when they are at least one of,
   (a) above a threshold value for return loss on the type of the cable,
   (b) below a threshold value for attenuation on the type of the cable; and
   (c) below a threshold value for echo on the type of the cable.

9. The system of claim 7, wherein the second signals are flagged for the half duplex transmission when they are at least one of,
   (a) below a threshold value for return loss on the type of the cable,
   (b) above a threshold value for attenuation on the type of the cable; and
   (c) above a threshold value for echo on the type of the cable.

10. The system of claim 1, wherein the combiner comprises:
    a multiplying device that multiples the third signals times a variable value, such that each of the third signals is at a different frequency; and
    a summing device that receives the third signals from the multiplying device and generates the fourth signal therefrom, such that the fourth signal includes a sequential arrangement of the third signals.

11. The system of claim 1, wherein the fourth signal comprises one of frequency based tones, bins, and carrier signals.

12. The system of claim 1, wherein the first signal comprises at least one of audio data, video data, and raw data.

13. The system of claim 1, wherein the fourth signal is transmitted in one of an Ethernet system, a digital signal line (DSL) system, and a wireless system.

14. The system of claim 1, wherein:
the first signal is a single wideband signal;
the second and third signals are individual narrowband signals; and
the fourth signal is a frequency domain multiplexed wideband signal.

15. A method comprising:
(a) receiving a first signal;
(b) forming second signals from the first signal, each of the second signals being in a different range of frequencies;
(c) determining whether each of the second signals should be transmittable in partial duplex mode or full duplex mode;
(d) forming third signals through flagging each of the second signals as being a partial duplex-type signal or a full-duplex type signal based on step (c);
(e) combining the third signals to form a fourth signal; and
(f) transmitting the fourth signal.

16. The method of claim 15, wherein step (c) comprises:
(c1) determining the type of cable being used to transmit the fourth signal;
(c2) individually determining whether characteristics of each of the second signals is above or below a threshold value corresponding to the type of cable being used; and
(c3) individually flagging each of the second signals as being the partial duplex-type or the full duplex-type based on step (c2) corresponding to whether the characteristics of the second signal is above or below the threshold.

17. The method of claim 16, wherein the characteristics comprise at least one of return loss, attenuation, and echo.

18. The method of claim 16, wherein step (c1) comprises using a sensor to sense the type of the cable.

19. The method of claim 16, wherein step (c1) comprises looking up in a storage device the type of the cable.

20. The method of claim 15, further comprising:
using a single wideband signal as the first signal;
using narrowband signals as the second and third signals; and
using a frequency domain multiplexed wideband signal as the fourth signal.

21. The method of claim 15, further comprising:
using at least one of audio signals, video, signals, or raw data signals as the first to fourth signals.

* * * * *